March 27, 1973

L. LEINE ET AL 3,723,247

NUCLEAR REACTOR HAVING INTERNAL PUMPS

Filed Sept. 15, 1969

INVENTORS
LARS LEINE
STURE GAVLEFORS
BY OLLE ERIKSSON

INVENTORS
LARS LEINE
STURE GAVLEFORS
OLLE ERIKSSON
BY
Jennings Bailey, Jr

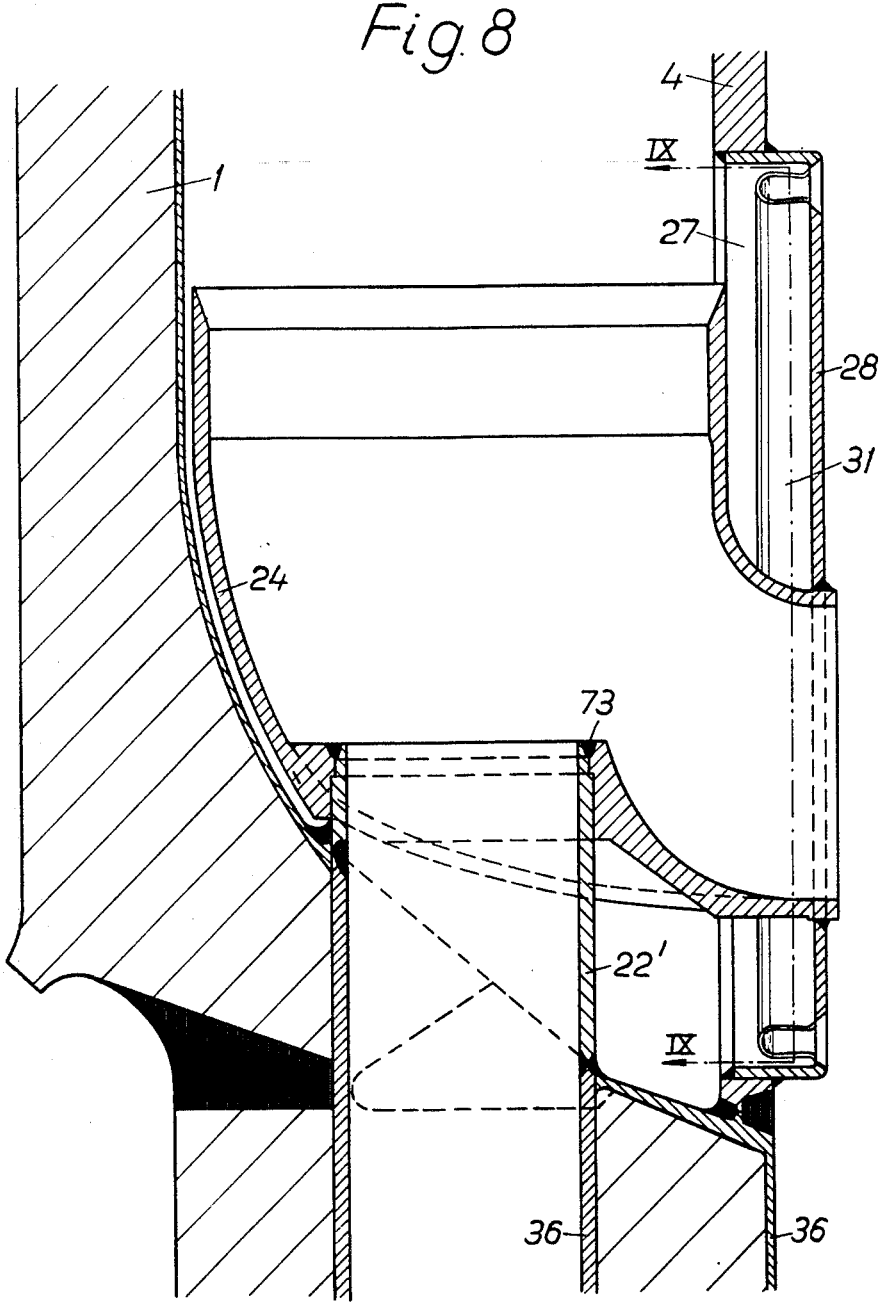

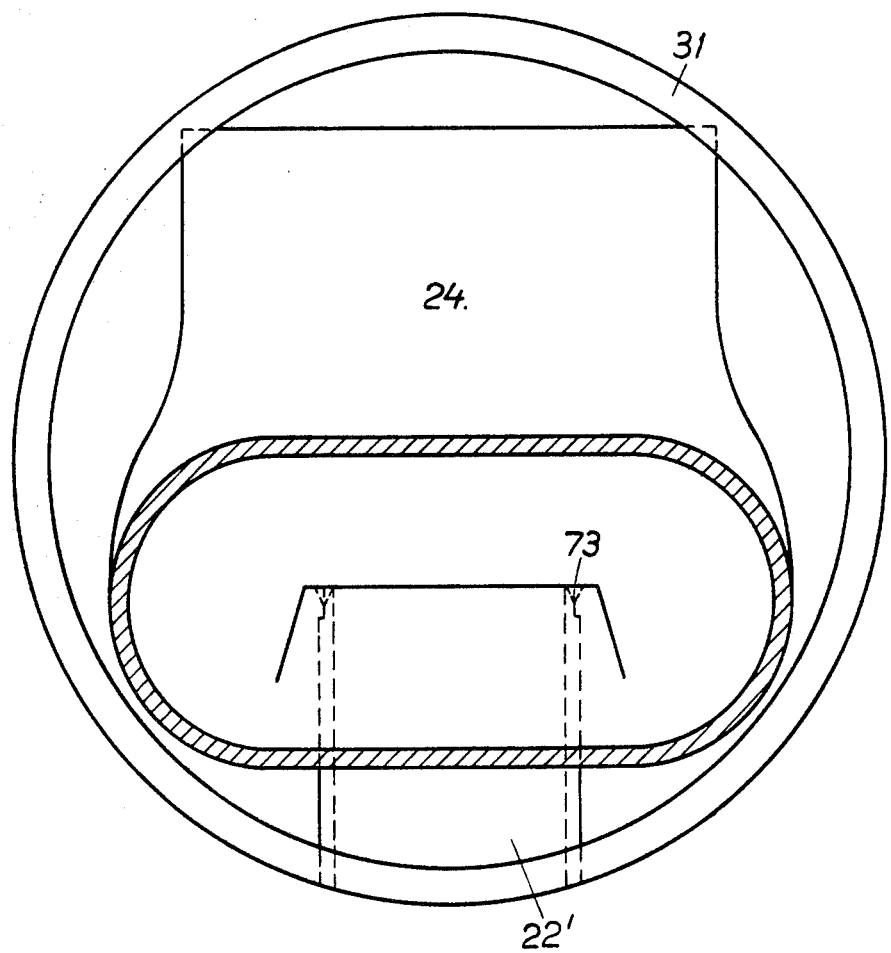

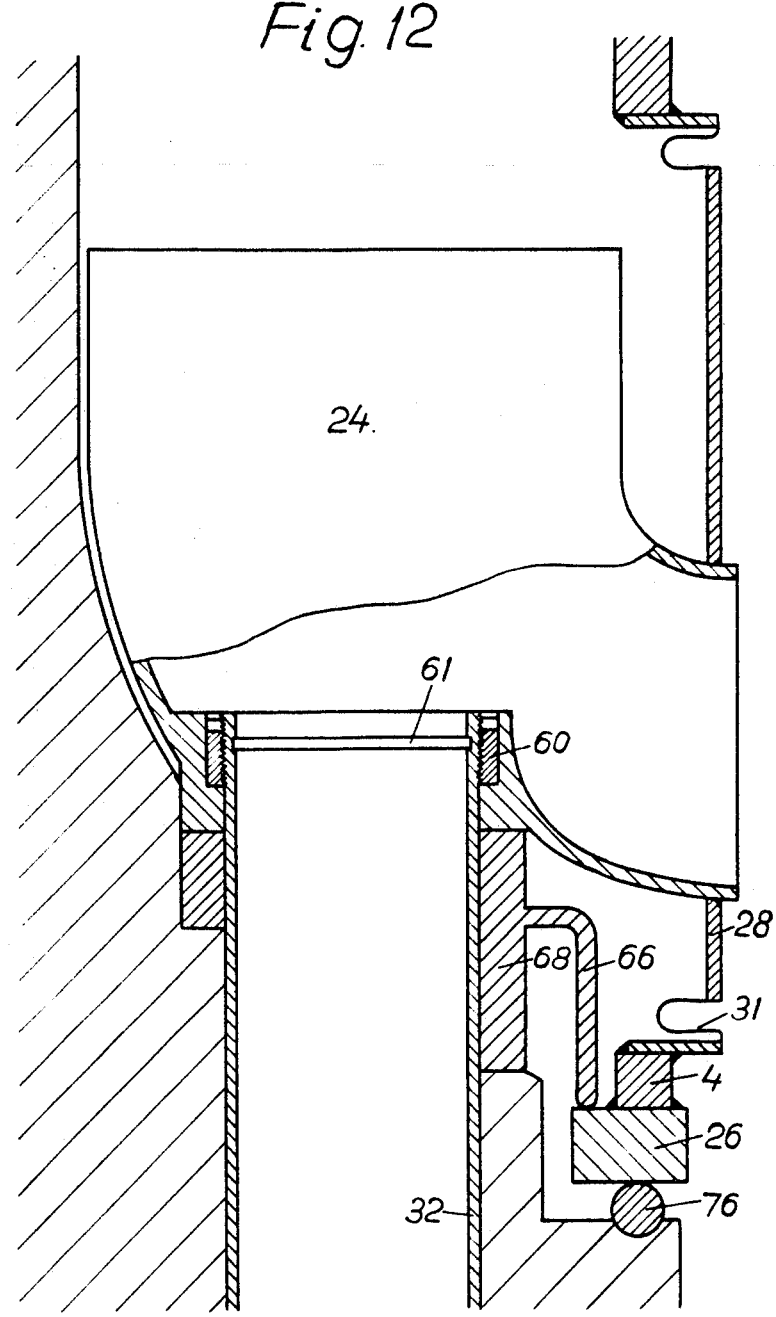

United States Patent Office 3,723,247
Patented Mar. 27, 1973

3,723,247
NUCLEAR REACTOR HAVING INTERNAL PUMPS
Lars Leine, Sture Gavlefors, and Olle Eriksson, Vasteras, Sweden, assignors to Allmanna Svenska Elektriska Aktiebolaget, Vasteras, Sweden
Filed Sept. 15, 1969, Ser. No. 857,686
Claims priority, application Sweden, Sept. 24, 1968, 12,824/68
Int. Cl. G21c *15/24*
U.S. Cl. 156—50       4 Claims

ABSTRACT OF THE DISCLOSURE

In a boiling water reactor having coolant recirculation pumps installed within an annular space between the reactor pressure vessel and an internal core shroud, the pump motors are arranged outside the reactor pressure vessel, the pump shafts penetrate the bottom part of the reactor pressure vessel in vertical shaft bores and the pump impellers are surrounded by pump casings having curved flow passages. The pump casings are rigidly attached either to the shaft bores or to the core shroud and flexibly sealed with respect to the core shroud or the shaft bores. The pump motors may be designed to operate in the reactor coolant and be enclosed in motor housing pressure vessels communicating with the reactor vessel.

BACKGROUND OF THE INVENTION (1) Field of the invention

The present invention relates to a nuclear reactor, preferably a boiling water reactor, having internal pumps for forced circulation of the coolant.

More specifically, the invention relates to a nuclear reactor cooled by forced circulation of a liquid coolant, said reactor comprising a reactor core arranged inside a moderator tank member, a reactor pressure vessel surrounding the moderator tank and having a bottom part, an annular, vertical gap between the moderator tank and the reactor vessel, a plurality of through-flow connections between a lower part of the gap and the inside of the moderator tank at a level below the core, and a plurality of annularly arranged circulation pumps, each pump comprising a pump motor arranged outside the reactor vessel, a pump shaft passing through a shaft receiving member arranged in the bottom part of the reactor vessel and an impeller arranged in a flow path from the annular gap to the inside of the moderator tank.

The prior art

It has previously been proposed to provide boiling light water reactors with internal circulation pumps in substantially the manner described above. The lower part of the annular gap has then been separated from the upper part by means of a covering plate arranged horizontally between the wall of the reactor vessel and the wall (sometimes called the core shroud) of the moderator tank. Through this covering plate penetrate a number of vertical cylindrical pump casings in which the impellers operate at substantially the same level as the covering plate. By means of vanes arranged below the impeller, each pump casing is connected to an elongated tubular bearing-bush carrier surrounding the pump shaft and can slide at its upper edge in an inlet ring applied on the upper side of the covering plate.

The proposed construction has an essential disadvantage. Considerable clearance is required between impeller and pump casing, partly because the pump tends to skew when the reactor vessel is placed under pressure and partly because the thermal expansion of the reactor vessel and its internal parts reduces the width of the gap, and a large clearance causes low efficiency of the pumps.

SUMMARY OF THE INVENTION

The object of the invention is to construct a nuclear reactor of the type described above where the disadvantage mentioned above is eliminated. This is achieved by surrounding each impeller by a pump casing having a curved flow passage and a separate hole for the pump shaft, the pump casing being rigidly attached to either the shaft receiving member or the moderator tank and flexibly sealed, at least indirectly, with respect to the other.

According to one embodiment of the invention each pump casing is rigidly attached to the moderator vessel by means of a welded joint and flexibly sealed, at least indirectly, with respect to the approximate shaft receiving member by a rod seal, such as a labyrinth seal or a piston-ring seal. The pump casings may then be built together to form a ring-shaped distributor box having dividing walls between the impellers. Preferably each pump casing surrounds a diffusion ring means. The diffusion ring means comprises a first ring member surrounding the impeller, a second ring member projecting from the shaft receiving member and guide vanes connecting said ring members, the second ring member being shaped as a stud-like continuation of the shaft receiving member. At least one flexible sealing means is arranged between the pump casing and the diffusion ring means. The diffusion ring means is rigidly attached to the shaft receiving member preferably by means of a clamp means.

According to a second embodiment of the invention, each pump casing is rigidly attached to its appropriate shaft receiving member by means of a welded joint or a clamping means, for example, and flexibly sealed with respect to the moderator tank, for example by means of an annular membrane having a curved cross-section.

In both these embodiments it is advantageous if the clamping means forms a part of the shaft receiving member and comprises a pipe coaxially surrounding the pump shaft and passing through the reactor vessel wall both ends of the pipe having radially projecting members, for example a nut and a flange or two nuts. At least one of the radially projecting members (the nut) is removable from the appropriate end of the pipe and axially displaceable against the other radially projecting member in order to obtain a desired clamping action. It is suitable to arrange an inner groove in the threaded pipe end to provide a grip for a tension means to obtain a predetermined pre-stress by stretching the pipe to a certain length before the nut is screwed up.

If the pump shafts are arranged substantially vertically, the clamp means can be used with particular advantage to clamp the lower part of the moderator tank to the bottom part of the reactor vessel. In such a case the moderator tank is provided with a lower flange which is at least indirectly clamped fast to the bottom of the reactor vessel by means of the clamp means over connecting members, for example in the form of relatively stiff, yet resilient spring elements. This arrangement facilitates inspection of the internal parts and the bottom of the reactor.

Preferably a sealing means is arranged between the impeller and the shaft receiving member, which sealing means acts as a seal around the shaft when the reactor is shut down and the pump shaft stationary and lowered for dismounting the pump motor.

From the safety point of view the pump shaft preferably has a flange arranged between the impeller and the shaft receiving member, said flange preventing the pump from being pressed out through the shaft receiving member upon an accident.

The pump motor is advantageously designed to operate in the coolant and is enclosed in a motor housing in the form of a pressure vessel, which is in pressure communication with the reactor vessel through a narrow annular gap arranged between the shaft receiving member and the pump shaft. The pump shaft is in this case preferably journalled in at least two bearings, said bearings being situated only in the motor. By this design the problem of attaining satisfactory sealing against the pump shaft is eliminated.

In the embodiments of the invention described above the clearances between the impeller and the pump casing or the diffusion ring means if such is present is influenced only negligibly or not at all by the reactor vessel being pressurised and the pumps consequently skewing. Furthermore, these embodiments are quite insensitive to the thermal expansions of the reactor vessel and internal parts which reduce the width of the gap.

BRIEF DESCRIPTION OF THE DRAWINGS

In the following the invention will be described in more detail with reference to the accompanying drawings.

FIG. 8 shows in longitudinal section an alternative attachment for the pump casing.

FIG. 9 shows the section IX—IX in FIG. 8.

FIG. 12 shows partly in longitudinal section an alternative arrangement for simultaneously clamping fast the pump casing and the moderator vessel.

BRIEF DESCRIPTION OF THE DRAWINGS

Figure 1:
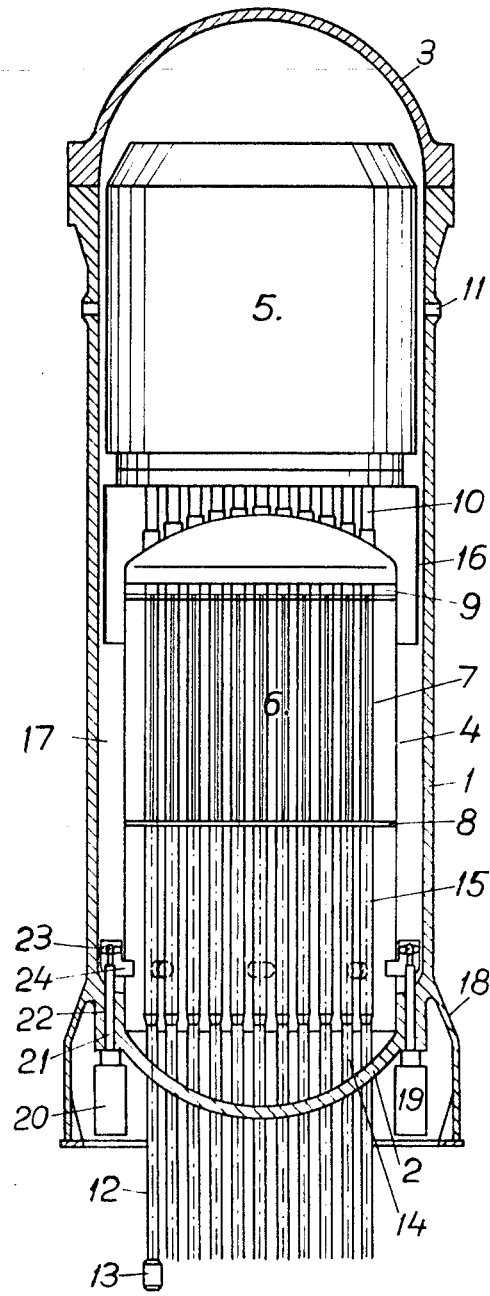
FIG. 1 is a partial longitudinal section through a nuclear reactor.

The nuclear reactor shown in FIG. 1 is a boiling light water reactor having internal steam separation and forced circulation. The reactor has a reactor pressure vessel 1 with a bottom part 2 and a lid 3. The reactor pressure vessel 1 rests on supports 18 and surrounds a moderator tank 4 and a core superstructure 5. Inside the moderator tank 4 is a reactor core 6 comprising a plurality of vertical fuel assemblies 7 constructed of parallel fuel rods containing a ceramic nuclear fuel such as $UO_2$ pellets in fuel cans. In the embodiment shown the fuel assemblies 7 stand in a core bottom 8 and are supported at the top by a core grid 9. The core superstructure 5 comprises steam separators, the lower ends of which are designated 10, and steam dryers, and is removably attached to the moderator tank 4. The saturated steam produced leaves the reactor pressure vessel 1 through connections 11. Several control element assemblies 12 regulate the reactivity of the reactor, each control element assembly comprising a driving motor 13, a connection piece 14, a guide tube 15 and a control rod. The control element assemblies pass into the reactor through the bottom part 2 of the reactor vessel.

The water separated in the steam separators and steam dryers is carried down to a feedwater shield 16 arranged on a level with the top of the core, where it is mixed with feedwater supplied. The coolant then continues down in a narrow, annular, vertical gap 17 between the reactor vessel 1 and the moderator vessel 4, is pumped by the pumps 19 into the lower part of the moderator tank 4, to once more rise through the core 6. Each pump 19 comprises a pump motor 20, a pump shaft 21 passing through a shaft receiving member 22 arranged in the bottom part 2 of the reactor vessel, an impeller 23 and a pump casing 24 having a curved flow passage.

Some different arrangements for attaching and sealing the pump casings can be seen in FIGS. 2a–f.

Figure 2A:
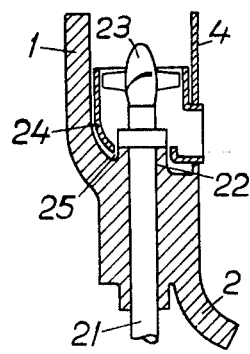
FIGS. 2a–f show schematically, partly in longitudinal section, six different construction arrangements for internal circulation pumps.
Figure 2B:
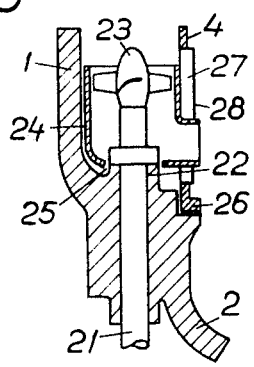
Figure 2C:
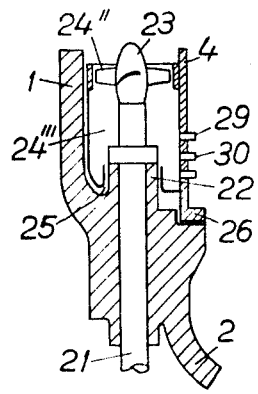

FIGS. 2a–c show embodiments where the pump casing 24 is rigidly attached to the moderator tank 4 by means of a welded joint and flexibly sealed with respect to the shaft receiving member 22 by means of a narrow gap 25. The moderator tank 4 in FIG. 2a is welded to the bottom part 2 of the reactor vessel.

FIG. 2b differs from FIG. 2a in that the moderator tank 4 is provided with a lower flange 26 which is screwed fast to the bottom part 2 of the reactor vessel. Furthermore, there are circular holes 27 in the moderator tank 4 into which circular, flanged covering plates 28 are welded, the outlets of the pump casings 24 being welded into these. This facilitates mounting of the pump casings 24.

FIG. 2c shows an embodiment where the pump casings 24 are built together to form a ring-shaped distributor box welded to the moderator tank 4 and having an outer and lower wall 24', an upper wall 24" with circular holes slightly bigger than the diameter of the impeller 23, and intermediate walls 24''' between the impellers 23. The inner wall consists of the moderator tank 4 and is perforated by a plurality of holes 29. The inlets of the holes 29 have rounded edges and their outlets are extended by short tubular projections 30. In this case also the moderator tank is screwed fast to the bottom 2 of the reactor vessel.

The pressure difference between the inlet and outlet of the pump casing is up to about 2 bar. When the electricity is cut off to one of, for example, eight pump motors, therefore, the water will be pressed back through the pump casing and thus also cause the pump shaft to rotate in the wrong direction. The reverse speed must not exceed the nominal pump speed. One method of ensuring this is to see to it that the friction losses at reverse flow are greater than at forward flow. The holes 29 which have rounded inlets and outlets extending into short tubular projections 30 offer one of several solutions to this problem.

Figure 2D:
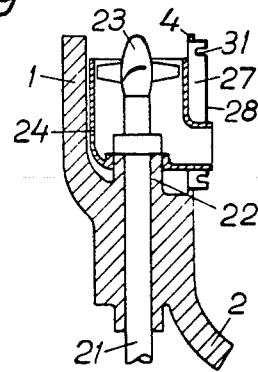
Figure 2E:
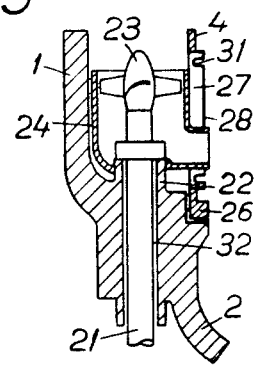
Figure 2F:
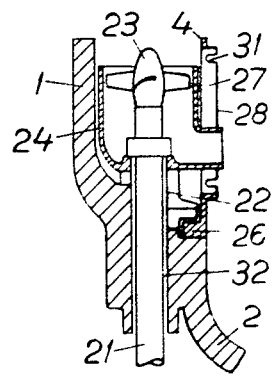

FIGS. 2d–f show embodiments where the pump casing 24 is rigidly attached to the shaft receiving member 22 and flexibly sealed with respect to the moderator tank 4 by means of a ring-shaped membrane 31 with curved-cross section. As in FIG. 2b, the outlet of the pump casing 24 is welded into a circular covering plate 28 provided with a collar, which in turn is welded into a circular hole 27 in the moderator tank 4. The membrane 31 is arranged between the collar and the covering plate 28.

In FIG. 2d the pump casing 24 is welded to the shaft receiving member 22 and the moderator tank 4 welded to the bottom part 2 of the reactor vessel, while in FIG. 2e the pump casing 24 is clamped against the shaft receiving member 22 by means of a clamping tube 32 and the moderator tank 4 is screwed fast with its flange 26 against the bottom part 2 of the reactor vessel. Finally, in FIG. 2f the pump casing 24 and moderator vessel are both clamped fast by means of the clamping tube 32. The clamping action is transmitted through intermediate members to the flange 26.

Figure 3:
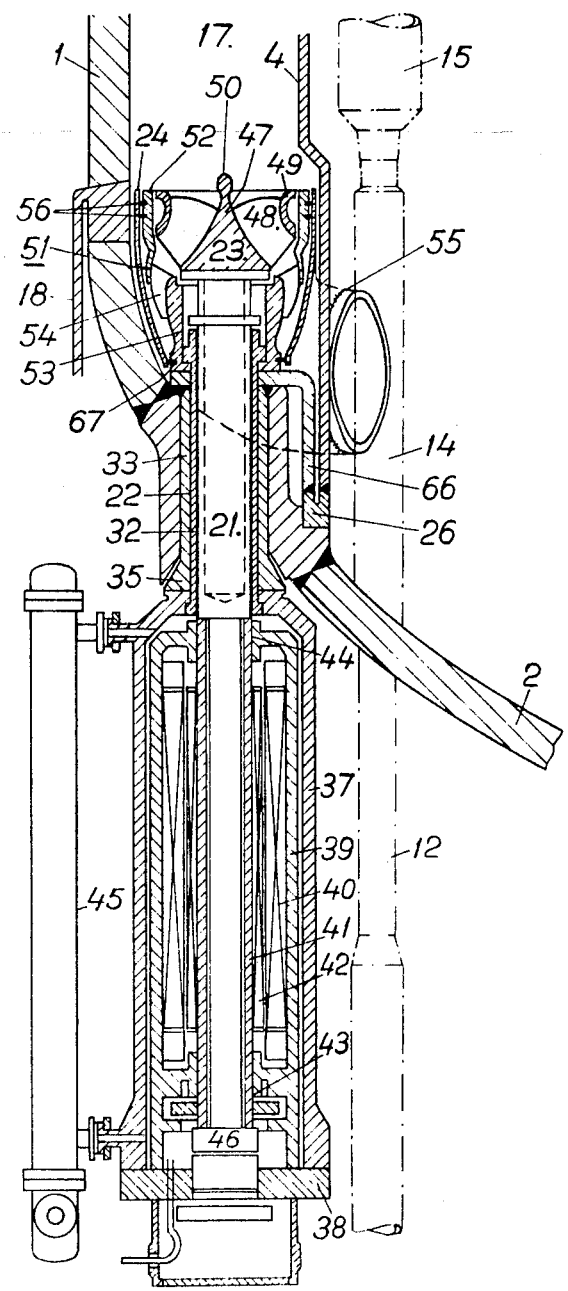
FIG. 3 shows a longitudinal section through an internal circulation pump.
Figure 4:
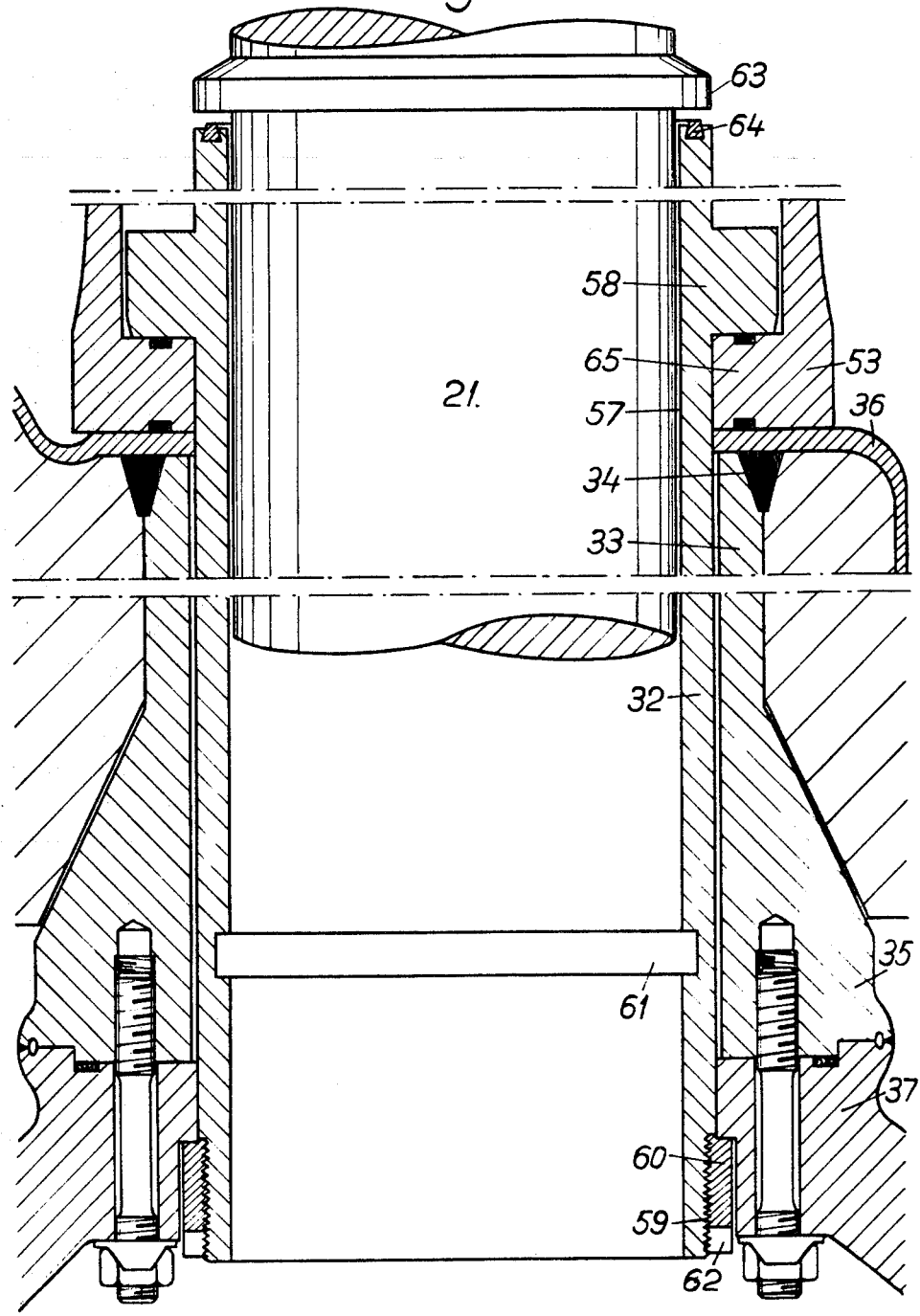
FIG. 4 shows, partly in longitudinal section, details of the pump shaft receiving member.
Figure 5:
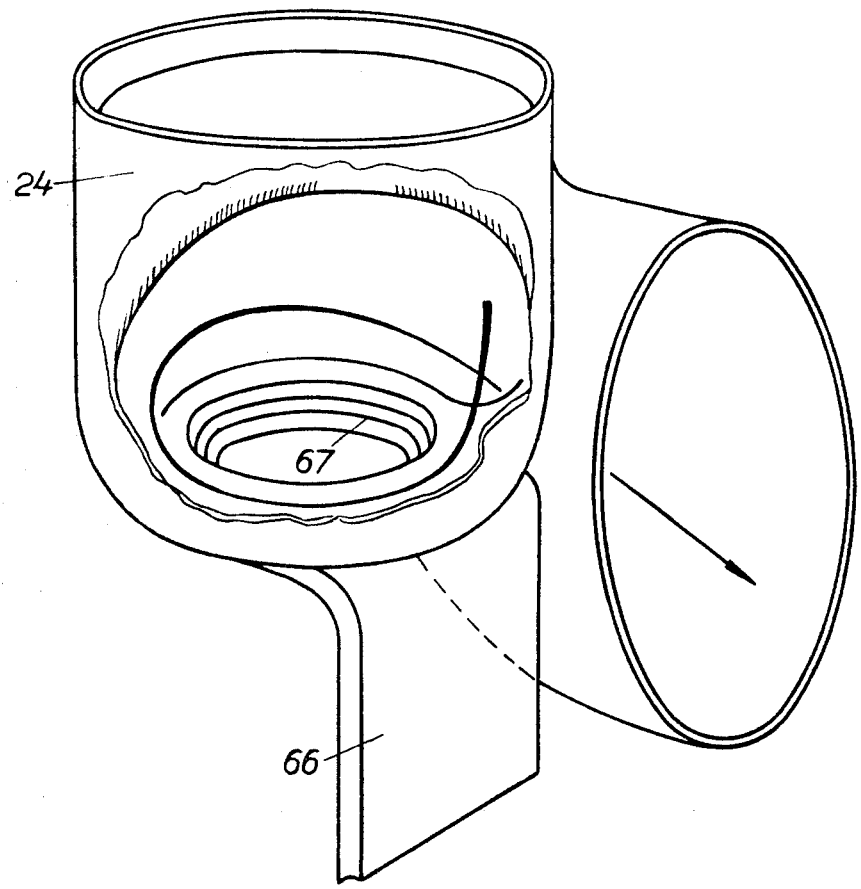
FIG. 5 shows in perspective the pump casing in the pump according to FIG. 3.

A preferred embodiment of the invention is shown in FIGS. 3–5. The shaft receiving member 22 comprises a through-going tube 33, the inner end of which is welded to the bottom part 2 of the reactor vessel 1 by means of a weld seam 34 (FIG. 4). The outer end of the tube 33 is shaped as a flange 35 and the reactor vessel is lined with stainless steel 36.

A motor housing 37 is secured by bolts to the flange 35. The motor housing is designed as a pressure vessel and has a lid 38 at its lower end to support the pump motor 20 (FIG. 1). The motor 20 can be inserted into the motor housing 37 as a unit and comprises a stator 39 with stator winding 40 attached to the lid 38 and a rotor with tubular rotor shaft 41 having a short-circuited rotor winding 42. The rotor is journalled in a lower combined radial and axial bearing 43 and an upper radial bearing 44. The pump motor operates entirely immersed in circulating coolant of reactor pressure and such a temperature that a predetermined maximum temperature (for example 60°) for the motor is not reached. The coolant circuit comprises the heat exchanger 45. The pump shaft 21 runs down through the entire rotor to a coupling 46 arranged below the combined radial and axial bearing 43 and connecting the rotor to the pump shaft 21. The pump shaft 21 is hollow at the top.

The impeller 23 shown in FIG. 3 is of the so-called "mixed flow" type and has a hub 47 from which a number of vanes project, joined at their outer edge to a ring-shaped profiled rail 49. The top of the hub 47 is shaped as a lifting head (50) for a handling tool which, after disengagement of the shaft coupling 46, can lift the pump shaft 21 straight up through the gap 17.

The pump impeller 23 is surrounded by a diffusion ring means 51 having an upper, outer ring member 52, a lower, inner ring member 53 and guide vanes 54 connecting the ring members 52 and 53. The diffusion ring means 51 is rigidly attached to the shaft receiving member 22 by means of the clamping tube 32.

The pump casing, the appearance of which is seen most clearly in FIG. 5, surrounds the diffusion ring means 51 and is rigidly attached to the moderator vessel 4 by means of a welded joint 55 around the outlet of the pump casing 24. The gap between the pump casing 24 and the diffusion ring means 51 is sealed by piston rings 56, for example of graphite, arranged in the diffusion ring means 51.

The pump shaft 21, which is journalled only in the motor bearings 43 and 44, is surrounded at its upper part by the clamping tube 32, but is separated from this by means of a narrow annular gap 57 which provides pressure communication between the reactor vessel 1 and the motor housing 37. In the embodiment shown in FIG. 4 the clamping tube 32 is provided at its lower end with an external thread 59 in which a nut 60 can threadedly engage, and an internal groove 61. In order to facilitate tightening and loosening of the nut 60, its side facing the motor is provided with teeth 62. The groove 61 is intended as a grip for a tension means which stretches the tube 32 to a certain length, after which the nut 60 is tightened to abut the motor housing 37. In this way a predetermined prestress is achieved in the tube.

The pump shaft 21 which is shown in FIG. 4 in its operating position can be lowered a few millimeters so that when the reactor is shut down and the pump shaft stationary a flange 63 arranged on the pump shaft 21 abuts against a sealing ring 64 arranged in the upper part of the clamping tube 32 in order to seal the gap 57 when the pump motor is being dismounted. It is then necessary to drain the motor housing 37 through a drainage pipe in the bottom of the motor housing. The flange 63 is stable enough to prevent the pump shaft 21 from being pressed out through the shaft receiving member upon an accident.

The bottom part 53 of the diffusion ring means has an inwardly directed flange 65 which is clamped against the shaft receiving means by the clamping tube flange 58 and is provided with sealing rings.

Whereas in FIG. 4 the moderator tank is intended to be attached to the bottom part of the reactor vessel by means of a screw joint, FIG. 3 shows an example of how the clamping tube 32 can also be used to attach the moderator tank. At the lower part of the moderator tank 4 a flange 26 is welded on, and to this flange 26 is welded an angled leaf spring 66. The free end of the leaf spring is shaped as a ring 67 and is clamped between the flange 65 of the diffusion ring means and the shaft receiving member. This embodiment makes the inside of the reactor tank easily accessible for thorough inspection of parts around the shaft receiving member as well.

Figure 6:
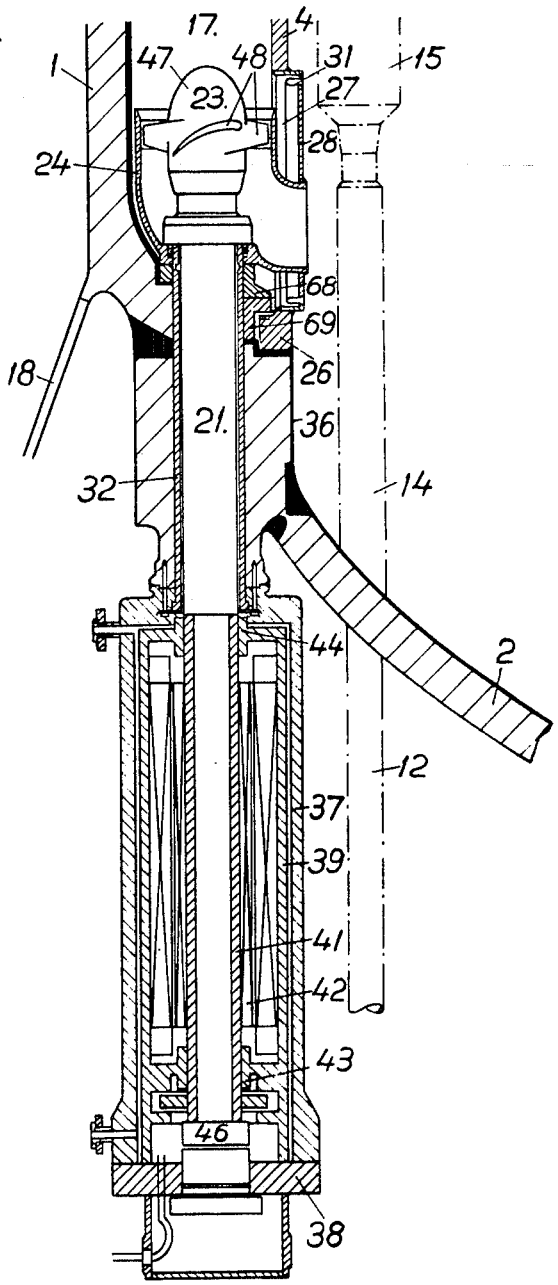
FIG. 6 shows in longitudinal section an alternative embodiment of an internal circulation pump.
Figure 7:
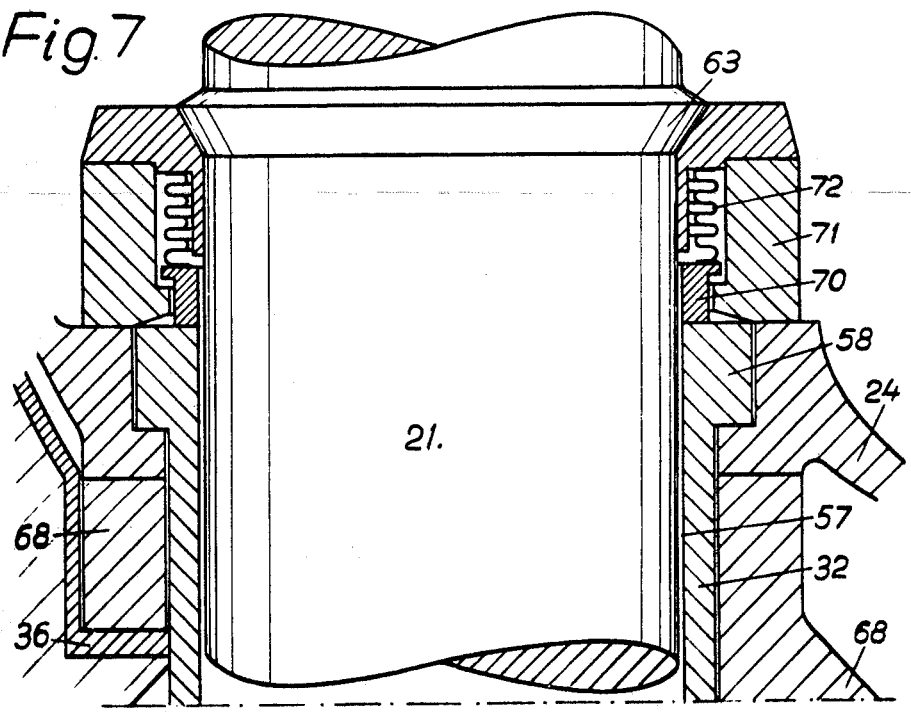
FIG. 7 shows, partly in longitudinal section, an alternative embodiment of details of the shaft receiving member.

The embodiments according to FIGS. 6 and 7 agree with that according to FIG. 2f, but are more detailed. However, they are so similar to FIGS. 3 and 4 that only the differences will be commented on below.

FIG. 6 shows the pump casing 24 angled and rigidly attached to the shaft receiving member by means of the clamping tube 32. In this case the nut 60 and flange 58 have exchanged places. It is also possible to replace the flange 58 by a nut so that both ends of the clamping tube 32 are provided with nuts. The pump casing 24 abuts the shaft receiving member through an intermediate ring 68. These intermediate rings 68 are attached to a large circular guide 69 in which a plurality of members having adjustable height, for example lockable screws, are arranged, by which the contact pressure against the flange 26 of the moderator vessel can be controlled.

The pump casing 24 is flexibly sealed to the moderator vessel 4 over the membrane 31 with curved cross-section, as described for FIG. 2f and has substantially the appearance which is most clearly seen in FIGS. 8 and 9. The impeller is of "axial flow" type.

FIG. 7 shows the pump shaft 21 in its lower position, sealing position. In this case the gap 57 is sealed by an axially movable sealing ring 70 abutting the flange 58 of the clamping tube 32. A seal housing 71 attached on the pump shaft 21 and projecting from the flange 63 surrounds a sealing bellows 72, the lower end of which is attached to the sealing ring 70. The bellows 72 seals against leakage on the upper side of the sealing ring 70. With respect to ensurance against the pump shaft 21 being pressed out through the shaft receiving member upon an accident, the seal housing 71 may be said to pertain to the flange 63.

FIGS. 8 and 9 are primarily intended to show the form of the pump asing 24 in the attachment alternative shown in FIG. 2d. The shaft receiving member comprises an inner tubular stud 22' to which the pump casing 24 is welded by means of a welding seam 73 located inside the pump casing.

Figure 10:
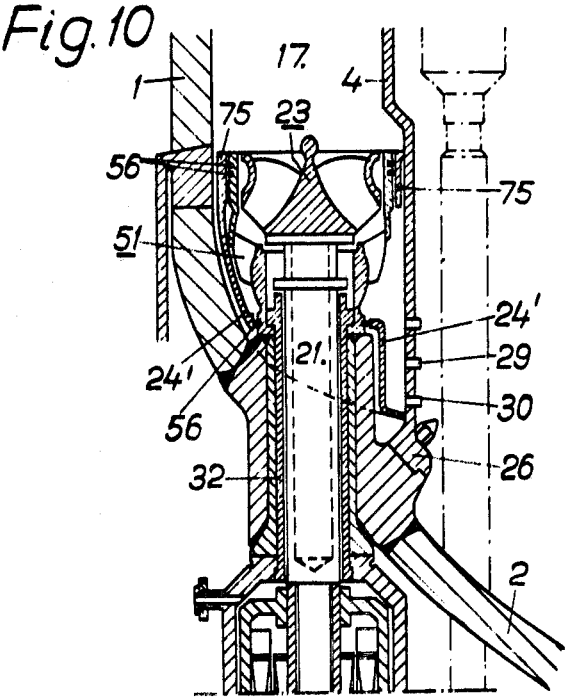
FIG. 10 shows partly in longitudinal section an embodiment where the pump casings are built together to form a ring-shaped distributor box.
Figure 11:
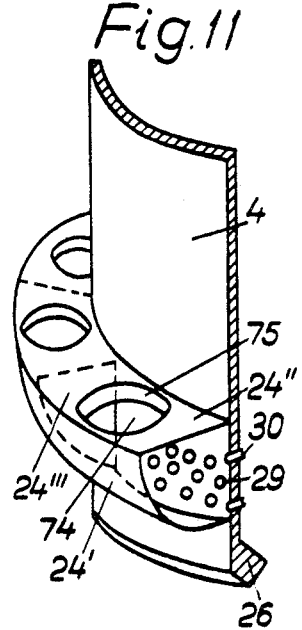
FIG. 11 shows schematically the distributor box in a partly sectioned perspective view.

FIGS. 10 and 11 refer to the embodiment shown in FIG. 2c and described above in which the pump casings 24 are built together to form a ring-shaped distributor box welded to the moderator tank 4 and provided with intermediate walls 24'''. The upper limiting wall 24'' of the distributor box has a hole 74 with a collar 75 for each impeller 23. As is clear from FIG. 10, the outer limiting wall 24' is not uniformly curved but is pressed in at each shaft receiving member. As in the embodiment according to FIG. 3 a firmly clamped diffusion ring means 51 with piston ring seals 56 is used here, the upper ones sealing against the collar 75 and the lower one against the limiting wall 24'. Other details have been described with reference to FIGS. 2c and FIG. 3.

FIG. 12 illustrates alternative clamping of the moderator tank 4 against the bottom part 2 of the reactor vessel and forms partly a combination of the embodiments according to FIGS. 3 and 6. Also in FIG. 12 the pump casing 24 rests on an intermediate ring 68 and an angled leaf spring 66 transmits tension from the clamping tube 32 to the flange 26 of the moderator tank. The leaf spring 66 is welded or attached in some other way to the intermediate ring 68. The flange 26 rests against the reactor vessel through a large circular sealing ring 76 which gives certain flexibility in the clamping of the moderator tank.

An alternative embodiment of the pump casing is an embodiment which may be characterised as "trouser" type. The impeller operates on a level with the "trouser waist band" and outflow takes place through the two "trouser legs" which are arranged at a certain angle to each other.

We claim:

1. A nuclear reactor cooled by forced circulation of a liquid coolant, said reactor comprising a moderator tank member, a reactor core arranged inside said moderator tank member, a reactor pressure vessel surrounding the moderator tank member and having a bottom part end spaced from the moderator tank member to provide an annular, vertical gap between the moderator tank member and the reactor vessel, means forming a plurality of through-flow connections between a lower part of the gap and the inside of the moderator tank member at a level below the reactor core, a plurality of shaft receiving members arranged in the bottom part of the reactor vessel, and a plurality of annularly arranged circulation pumps, each pump comprising a pump motor arranged outside the reactor vessel, a pump shaft passing through one of said shaft receiving members and an impeller arranged in a flow path from the annular gap to the inside of the moderator tank member, wherein the improvement comprises a pump casing surrounding each impeller having a curved flow passage and a separate hole for the pump shaft, means rigidly attaching the pump casing to one of said members and means flexibly sealing the pump casing with respect to the other of said members, said rigid attaching means attaching each pump casing to one of said shaft receiving members and comprising a clamp means, the clamp means forming a part of the shaft receiving member and comprising a pipe coaxially surrounding the pump shaft and passing through the reactor vessel wall, both ends of the pipe having radially projecting members, at least one of which is removable from the end of the pipe and axially displaceable with respect to the other radially projecting member in order to obtain a clamping action, at least one of the radially projecting members comprising a nut engaging in an external thread adjacent one end of the pipe, the threaded pipe end having an inner groove which provides a grip for a tension means for obtaining a predetermined pre-stress by stretching the pipe to a certain length before the nut is screwed up.

2. A nuclear reactor cooled by forced circulation of a liquid coolant, said reactor comprising a moderator tank member, a reactor core arranged inside said moderator tank member, a reactor pressure vessel surrounding the moderator tank member and having a bottom part end spaced from the moderator tank member to provide an annular, vertical gap between the moderator tank member and the reactor vessel, means forming a plurality of through-flow connections between a lower part of the gap and the inside of the moderator tank member at a level below the reactor core, a plurality of shaft receiving members arranged in the bottom part of the reactor vessel, and a plurality of annularly arranged circulation pumps, each pump comprising a pump motor arranged outside the reactor vessel, a pump shaft passing through one of said shaft receiving members and an impeller arranged in a flow path from the annuar gap to the inside of the moderator tank member, wherein the improvement comprises a pump casing surrounding each impeller having a curved flow passage and a separate hole for the pump shaft, means rigidly attaching the pump casing to one of said members and means flexibly sealing the pump casing with respect to the other of said members, said rigid attaching means attaching each pump casing to the moderator tank member and comprising a welded joint and said flexibly sealing means sealing each pump casing with respect to one of the shaft receiving members and comprising a rod seal, a diffusion ring means within each pump casing comprising a first ring member surrounding the impeller, a second ring member projecting from the shaft receiving member and guide vanes connecting said ring members, the second ring member constituting a stud-like continuation of the shaft receiving member and being rigidly attached thereto, said flexibly sealing means being arranged between the pump casing and the diffusion ring means, a damping means rigidly attaching the diffusion ring means to the shaft receiving member, the pump shafts being substantially vertical and the moderator tank having a lower flange, and connecting members between said lower flange and said shaft receiving member engaged by said clamp means, whereby the moderator tank is indirectly clamped fast to the bottom part of the reactor vessel, each connecting member comprising at least one stiff spring element.

3. A nuclear reactor as claimed in claim 2, wherein the diffusion ring means are rigidly attached to the shaft receiving members and each spring element comprises a stiff, curved spring tongue projecting from the flange of the moderator tank and ending in a ring clamped by the clamp means.

4. A nuclear reactor cooled by forced circulation of a liquid coolant, said reactor comprising a moderator tank member, a reactor core arranged inside said moderator tank member, a reactor pressure vessel surrounding the moderator tank member and having a bottom part end spaced from the moderator tank member to provide an annular, vertical gap between the moderator tank member and the reactor vessel, means forming a plurality of through-flow connections between a lower part of the gap and the inside of the moderator tank member at a level below the reactor core, a plurality of shaft receiving members arranged in the bottom part of the reactor vessel, and a plurality of annularly arranged circulation pumps, each pump comprising a pump motor arranged outside the reactor vessel, a pump shaft passing through one of said shaft receiving members and an impeller arranged in a flow path from the annular gap to the inside of the moderator tank member, wherein the improvement comprises a pump casing surrounding each impeller having a curved flow passage and a separate hole for the pump shaft, means rigidly attaching the pump casing to one of said members and means flexibly sealing the pump casing with respect to the other of said members, a sealing means between the impeller and the shaft receiving member which, when the reactor is shut down and the pump shaft stationary, acts as a seal around the shaft when dismounting the pump motor.

References Cited

UNITED STATES PATENTS

| | | | |
|---|---|---|---|
| 1,025,884 | 5/1912 | Schmitt | 176—87 |
| 3,231,474 | 1/1966 | Jones et al. | 176—56 X |
| 3,397,114 | 8/1968 | Deighton | 176—54 |
| 3,402,102 | 9/1968 | Kägi | 176—59 |
| 3,437,559 | 4/1969 | Junkermann et al. | 176—50 X |
| 3,467,578 | 9/1969 | Kornbichler et al. | 176—54 X |
| 3,527,032 | 9/1970 | Wood | 74—11 X |

FOREIGN PATENTS

| | | | |
|---|---|---|---|
| 1,115,354 | 5/1968 | Great Britain | 176—54 |

CARL D. QUARFORTH, Primary Examiner

E. E. LEHMANN, Assistant Examiner

U.S. Cl. X.R.

74—11; 176—54, 87